(12) United States Patent
Russell

(10) Patent No.: US 11,547,104 B2
(45) Date of Patent: Jan. 10, 2023

(54) FISHING LURE FURNISHINGS

(71) Applicant: Greg Russell, Gilmer, TX (US)

(72) Inventor: Greg Russell, Gilmer, TX (US)

( * ) Notice: Subject to any disclaimer, the term of this patent is extended or adjusted under 35 U.S.C. 154(b) by 564 days.

(21) Appl. No.: 16/672,354

(22) Filed: Nov. 1, 2019

(65) Prior Publication Data

US 2021/0127653 A1 May 6, 2021

(51) Int. Cl.
*A01K 85/01* (2006.01)
*A01K 85/14* (2006.01)
*A01K 85/08* (2006.01)
*A01K 97/00* (2006.01)

(52) U.S. Cl.
CPC .............. *A01K 85/01* (2013.01); *A01K 85/08* (2013.01); *A01K 85/14* (2013.01); *A01K 97/00* (2013.01)

(58) Field of Classification Search
CPC ........ A01K 85/01; A01K 85/08; A01K 85/14; A01K 97/00
See application file for complete search history.

(56) References Cited

U.S. PATENT DOCUMENTS

| | | | | |
|---|---|---|---|---|
| 2,694,877 A * | 11/1954 | Wise | ...................... | A01K 85/16 43/42.47 |
| 3,091,885 A * | 6/1963 | Ulsh | ...................... | A01K 85/00 43/43.12 |
| 3,762,092 A * | 10/1973 | Bercz | ...................... | A01K 85/01 43/44.87 |
| 4,108,955 A * | 8/1978 | Thom | ...................... | B44C 5/06 264/225 |
| 4,696,121 A * | 9/1987 | Hernden | ................ | A01K 91/04 43/43.12 |
| 5,333,406 A * | 8/1994 | Wylie | ................... | A01K 85/00 43/42.32 |
| 5,858,494 A * | 1/1999 | Cherkas | .................. | A61F 13/02 428/40.1 |
| 6,012,248 A * | 1/2000 | Kechriotis | ............ | A01K 85/16 43/42.53 |
| 6,748,694 B1 * | 6/2004 | Darling | .................. | A01K 91/04 43/42.49 |
| 7,735,256 B2 * | 6/2010 | Hatfield | ................. | A01K 85/00 43/43.12 |
| 8,021,732 B2 * | 9/2011 | Hegemier | .............. | A01K 85/01 428/40.1 |
| 8,627,594 B1 * | 1/2014 | Weron | ................... | A01K 85/16 43/42.32 |

(Continued)

*Primary Examiner* — Christopher R Harmon

(57) ABSTRACT

A fishing lure furnishing is provided, comprising a fishing lure body having an elongate member extending therefrom, wherein the fishing lure body comprises a first side having a non-planar contoured body surface and opposite thereto a second side having a planar body surface, wherein the fishing lure body comprises one or more first apertures disposed at a bottom portion of the fishing lure body; and one or more sets of hooks removably coupled to the fishing lure body, wherein each set of hooks comprises a plurality of hook segments coupled to one another, wherein each hook segment is coupled at a first end adjacent one or more coupling mechanisms disposed within the one or more apertures and terminates at a second end in a hemispherical shape, wherein the one or more coupling mechanisms detach from the lure body or one or more sets of hooks when a threshold amount of force is applied to the one or more coupling mechanisms.

20 Claims, 4 Drawing Sheets

(56) References Cited

U.S. PATENT DOCUMENTS

| | | | | |
|---|---|---|---|---|
| 9,078,420 B1* | 7/2015 | Rudy | A01K 85/00 | |
| 2002/0174593 A1* | 11/2002 | Siirtola | A01K 85/00 | 43/42.53 |
| 2011/0010983 A1* | 1/2011 | Briccetti | A01K 85/16 | 43/42.22 |
| 2013/0276350 A1* | 10/2013 | Smith | A01K 85/02 | 43/43.12 |
| 2016/0120159 A1* | 5/2016 | Tsybulnyk | A01K 85/01 | 43/26.2 |
| 2017/0000097 A1* | 1/2017 | Thomas | A01K 85/18 | |
| 2020/0352148 A1* | 11/2020 | Mancini | A01K 85/01 | |

\* cited by examiner

FISHING LURE FURNISHINGS

BACKGROUND OF THE INVENTION

Artificial fishing bait, such as fishing lures, are commonly used by anglers to attract and catch fish. Often, anglers manufacture or purchase specific fishing lure designs according to the type of fish being sought and/or the angler's aesthetic preferences. Such lures are produced with the aim of successfully catching a live fish and do not serve much of any other purpose. Given the artistic nature of the homemade fishing lure production process and the desire to incorporate the fishing lifestyle into one's everyday life, many anglers desire to enjoy their work and pastime even while not actively fishing.

Some anglers repurpose their favorite lures as home furnishings. However, such repurposing is not practical given the small form factor of the lures, the inability to easily arrange the lure within the home and the danger that the barbed hooks pose to residents of the home containing the lure furnishings. Typically, the lures are not visible enough as furnishings and do not allow for arrangement of the lure within the home in the manner in which the lure is most often used in practice—suspended horizontally in a fluid. The lure is rather placed upon an existing home object where it rests unappealingly or is suspended vertically via its fishing line eye where the barbed hooks remain a safety hazard for residents of the home and particularly for children or pets therein. Removal of the hooks takes away from the authenticity of the lure and grinding down of the hook ends can be tedious and dangerous.

It would be advantageous to provide a fishing lure furnishing having a form factor large enough for visibility as a furnishing, one or more hooks that are not a hazard to residents of the home having the furnishing, a coupling mechanism allowing the ability to be arranged in a realistic position relative its practical use and the ability to modularly produce various furnishings from a common lure template.

The present invention overcomes these obstacles by providing a fishing lure furnishing that may be produced via a mold of desired size to accommodate visibility of the furnishing, one or more hooks that may be made from a flexible material with hemispheric hook ends in place of a hook point/barb while the hooks may further comprise breakaway couplings to ensure any hook-related snags do not result in harm, a horizontal suspension mechanism allowing the furnishing to be suspended horizontally upon a wall or from a ceiling and a furnishing body that may be modularly utilized to create, for example, light switch cover furnishings, clock furnishings, picture frame furnishings, lampshade furnishings and the like.

BRIEF SUMMARY OF THE INVENTION

In some embodiments, a fishing lure furnishing is provided, comprising a fishing lure body having an elongate member extending therefrom, wherein the fishing lure body comprises a first side having a non-planar contoured body surface and opposite thereto a second side having a planar body surface, wherein the fishing lure body comprises one or more first apertures disposed at a bottom portion of the fishing lure body; and one or more sets of hooks removably coupled to the fishing lure body, wherein each set of hooks comprises a plurality of hook segments coupled to one another, wherein each hook segment is coupled at a first end adjacent one or more coupling mechanisms disposed within the one or more apertures and terminates at a second end in a hemispherical shape, wherein the one or more coupling mechanisms detach from the lure body or one or more sets of hooks when a threshold amount of force is applied to the one or more coupling mechanisms.

In some embodiments, the plurality of hook segments are coupled to one another via soldering or adhesive bonding.

In some embodiments, the hooks may be comprised of aluminum wire or silver solder.

In some embodiments, the one or more coupling mechanisms comprise one or more of: threaded screws, looped eyelits, split rings, ring clasps, clips and magnets.

In some embodiments, the fishing lure body comprises one or more second apertures disposed at a middle portion of the fishing lure body.

In some embodiments, the fishing lure body comprises one or more third apertures disposed at a top portion of the fishing lure body.

In some embodiments, the second side having the planar body surface is disposed adjacent a wall when the fishing lure furnishing is coupled to the wall.

In some embodiments, the second side having the planar body surface is disposed adjacent a portion of a lamp.

In some embodiments, a fishing lure furnishing is provided, comprising a fishing lure body having an elongate member extending therefrom, wherein the fishing lure body comprises opposing first and second sides having symmetric non-planar contoured body surfaces, wherein the fishing lure body comprises one or more first apertures disposed at a bottom portion of the fishing lure body and one or more second apertures disposed at a top portion of the fishing lure body; and one or more sets of hooks removably coupled to the fishing lure body, wherein each set of hooks comprises a plurality of hook segments coupled to one another, wherein each hook segment is coupled at a first end adjacent one or more coupling mechanisms disposed within the one or more apertures and terminates at a second end in a hemispherical shape, wherein the one or more first coupling mechanisms detach from the lure body or one or more sets of hooks when a threshold amount of force is applied to the one or more coupling mechanisms.

In some embodiments, a fishing lure furnishing is provided, comprising a fishing lure body having an elongate member extending therefrom, wherein the fishing lure body comprises a first side having a non-planar contoured body surface and opposite thereto a second side having a planar body surface, wherein the fishing lure body comprises one or more first apertures disposed at a bottom portion of the fishing lure body; one or more second apertures disposed at a middle portion of the fishing lure body, wherein an analog clock, light switch or picture frame is disposed within the one or more second apertures; and one or more sets of hooks removably coupled to the fishing lure body, wherein each set of hooks comprises a plurality of hook segments coupled to one another, wherein each hook segment is coupled at a first end adjacent one or more coupling mechanisms disposed within the one or more apertures and terminates at a second end in a hemispherical shape, wherein the one or more coupling mechanisms detach from the lure body or one or more sets of hooks when a threshold amount of force is applied to the one or more coupling mechanisms.

DETAILED DESCRIPTION

Before describing the present invention in detail, it is to be understood that the invention is not limited to any one of the particular embodiments, which of course may vary. It is also to be understood that the terminology used herein is for the purpose of describing particular embodiments only, and therefore is not necessarily intended to be limiting. As used in this specification and the appended claims, terms in the singular and the singular forms "a," "an," and "the" include plural referents unless the context clearly dictates otherwise. Thus, for example, reference to "a fishing lure furnishing" also includes a plurality of fishing lure furnishings, and the like.

Figure 1:
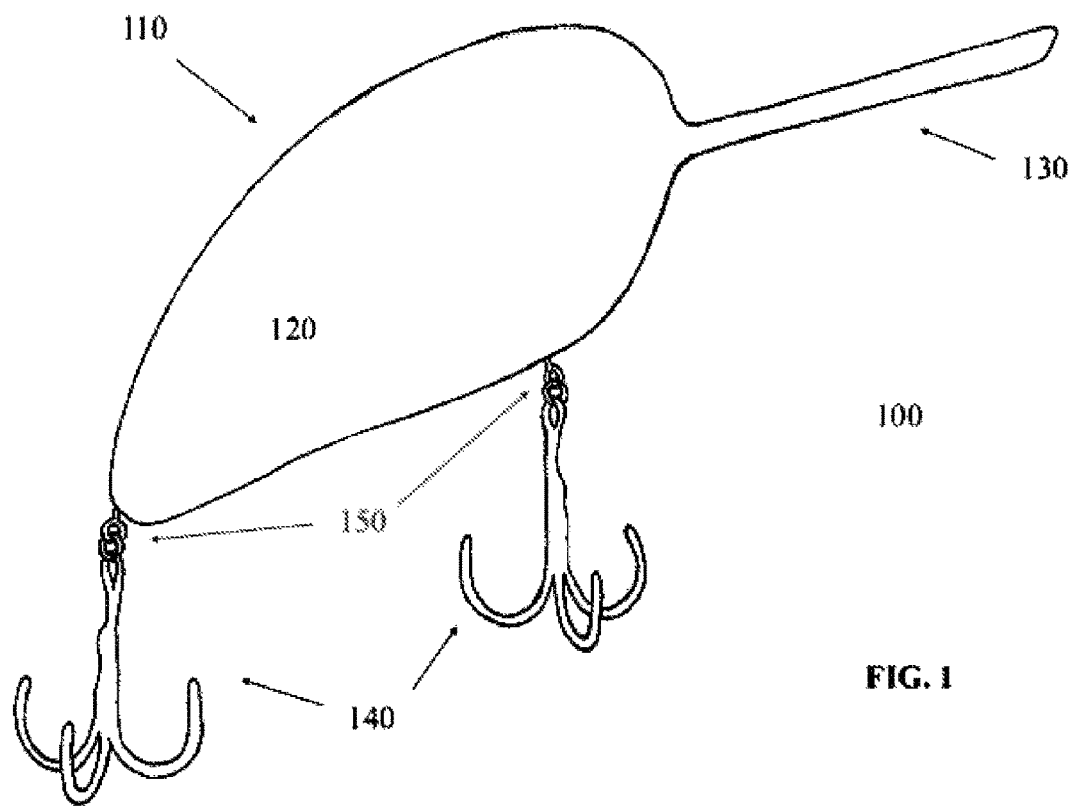
FIG. 1 is a side view of a fishing lure furnishing in accordance with some embodiments of the present invention.

Exemplary embodiments of the present invention are illustrated in the accompanying figures. As shown in FIG. 1, a fishing lure furnishing 100 may comprise a fishing lure 110 having a fishing lure body 120 and associated elongate member 130 extending therefrom. The furnishing 100 may further comprise one or more sets of hooks 140 removably coupled to the lure body 120 via one or more couplings 150. The hooks 140 may comprise one or more individual hook segments with each hook segment terminating in a blunted rounded end. Further, the hook segments may be coupled together via any suitable method such as, but not limited to, soldering or adhesive bonding.

The couplings 150 may removably couple the hooks 140 to the lure body 120 and may comprise one or more of threaded screws, looped eyelits, split rings, ring clasps, clips, magnets and the like. The couplings 150 may be structured so as to detach from one or both of the lure body 120 and hooks 140 when a threshold amount of force is applied thereto to prevent injury to a user if hooks 140 snag on an external object.

The hooks 140 may be made from any suitable material including, but not limited to, metals, plastics, wood, ceramics and the like. Preferably, the hooks 140 and associated hook segments may comprise 12 gauge aluminum wire or silver solder. Each hook segment may be individually bent in the shape of a typical hook at a first end and bent into a hook eye at a second end prior to coupling together and subsequent coupling to lure body 120 via couplings 150.

The furnishing 100 may be disposed upon a wall via any suitable means including, but not limited to, one or more of screws, nails, hooks, wiring, brackets, apertures and the like. The lure body 120 may comprise a first side having a non-planar non-uniform contoured body surface and opposite thereto a second side having a planar uniform body surface. When hung upon a wall, the planar second side of the lure body 120 is adjacent the wall surface and the non-planar first side faces outward from the wall.

Alternatively, the furnishing 100 may be suspended from a ceiling via one or more of wire, string, fishing line and the like and a top coupling (not shown) which may be the same or similar in structure and function to the couplings 150 described herein. When suspended from a ceiling, the lure body 120 may comprise first and second sides having substantially identical non-planar non-uniform contoured body surfaces.

Figure 6:
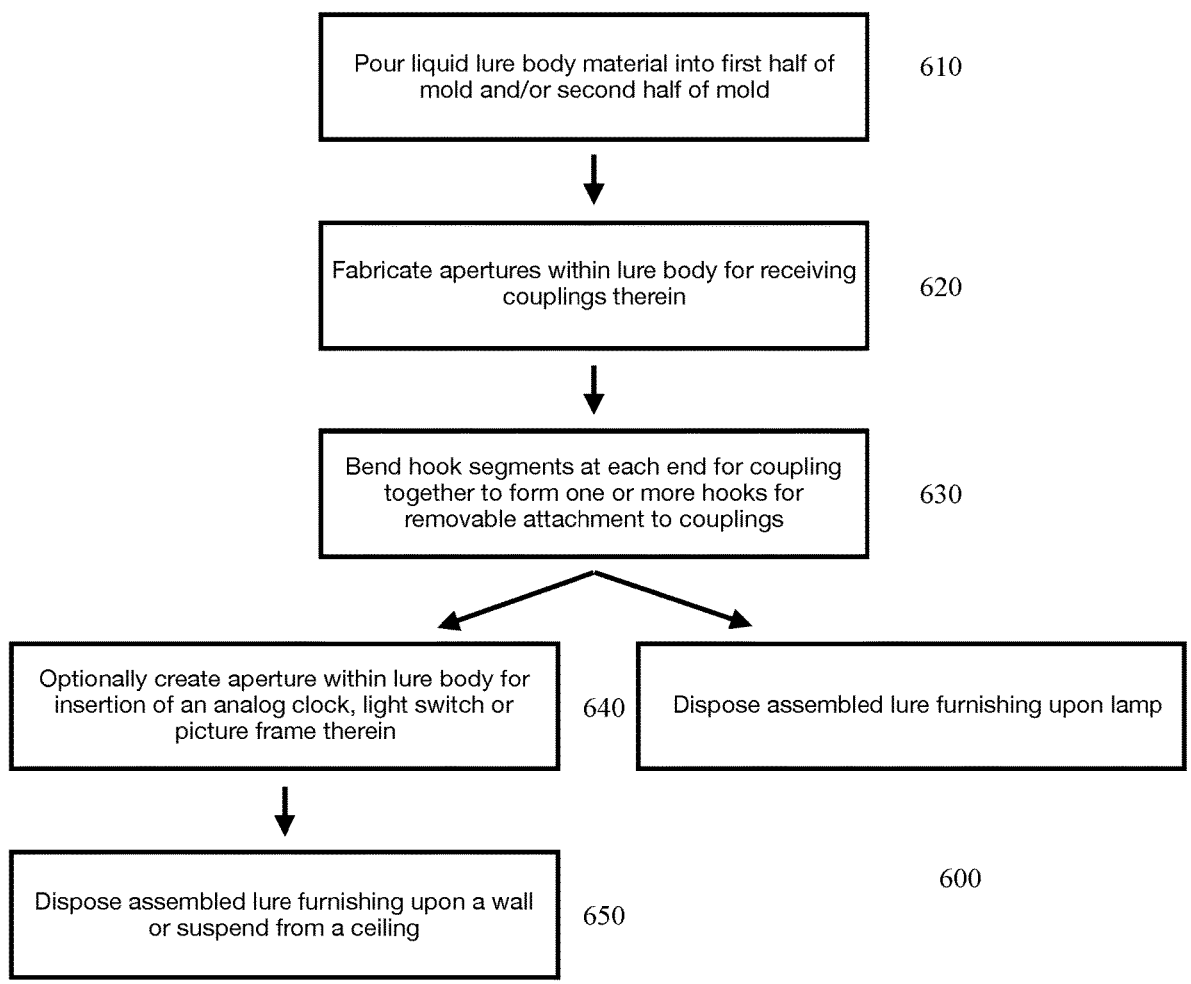
FIG. 6 is a flow chart of a method of manufacture of a fishing lure furnishing in accordance with some embodiments of the present invention.

As described in FIG. 6, the furnishing 100 may be fabricated using a mold having two halves. In the case of the furnishing 100 being hung from a wall, only one half of the mold may be utilized to fabricate the lure body 120, thus creating the aforementioned non-planar first side and planar second side. In the case of the furnishing 100 being suspended from a ceiling, both halves of the mold may be utilized to fabricate the lure body 120, thus creating the aforementioned non-planar first and second sides.

Figure 2:
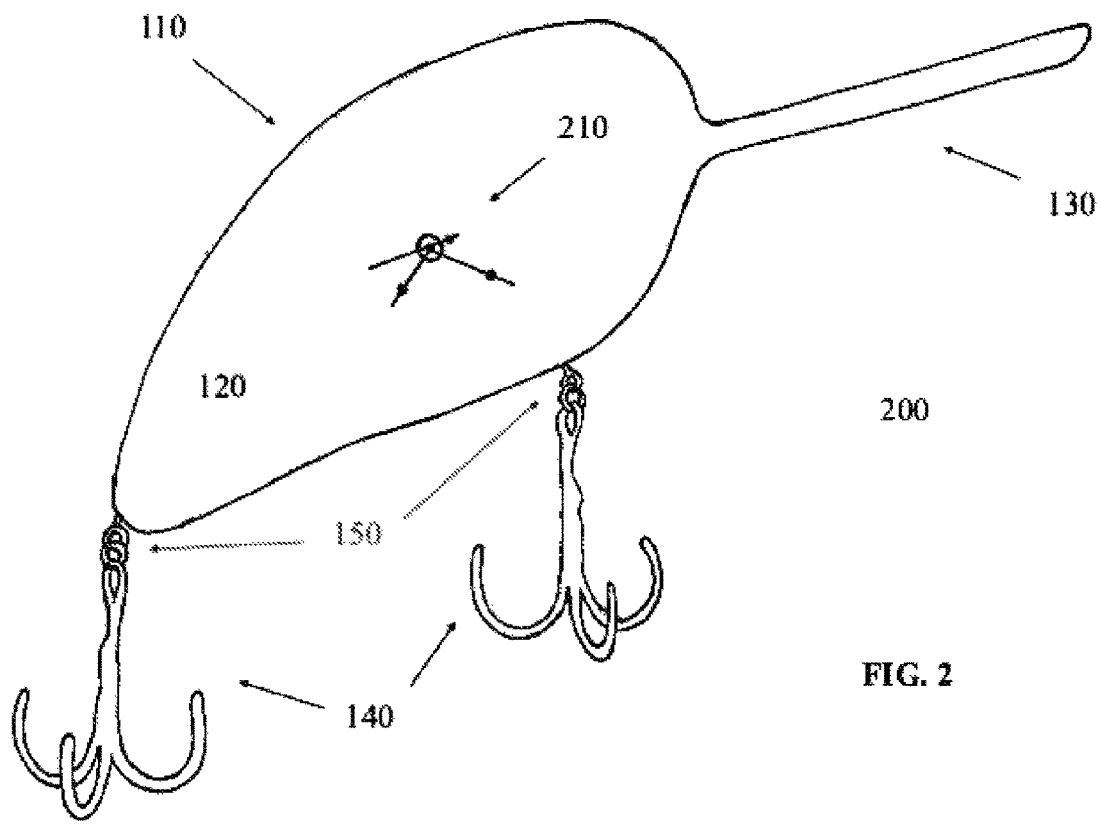
FIG. 2 is a side view of a fishing lure clock furnishing in accordance with some embodiments of the present invention.

As shown in FIG. 2, a fishing lure clock furnishing 200 may comprise the same or similar components described in FIG. 1 with the addition of an analog clock 210 disposed within the lure body 120. The analog clock 210 may comprise a first side having the hour, minute and second hands as shown and a second side having associated clock mechanics (not shown).

The analog clock 210 may be inserted into the lure body 120 after fabrication thereof, where such fabrication may utilize only one half of the mold. The first side of the analog clock 210 may be disposed on the non-planar first side of the lure body 120 and the second side of the analog clock 210 may be disposed on the planar second side of the lure body 120. An aperture may be formed within the lure body 120 after fabrication allowing for insertion of the analog clock 210 therein. Insertion of the analog clock 210 within the lure furnishing provides a user with additional utility of tracking time when choosing to hang the lure furnishing on the wall.

Figure 3:
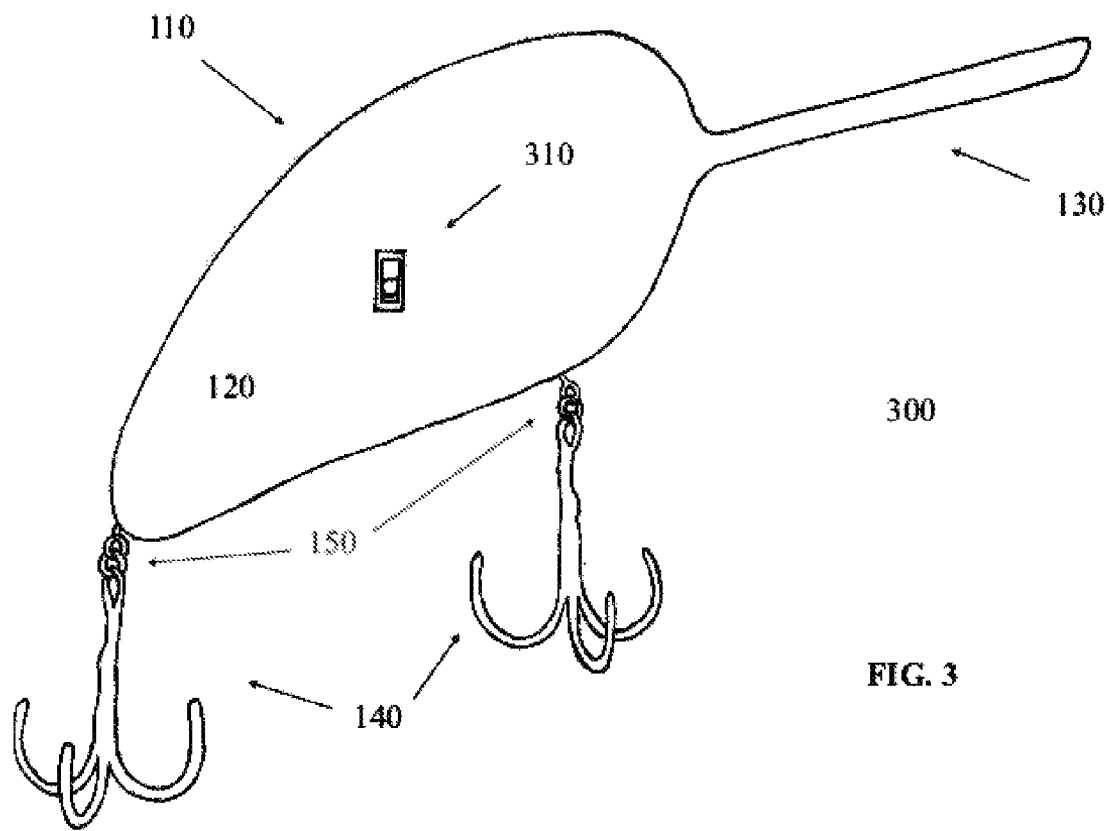
FIG. 3 is a side view of a fishing lure light switch furnishing in accordance with some embodiments of the present invention.

As shown in FIG. 3, a fishing lure light switch 300 may comprise the same or similar components described in FIG. 1 with the addition of a light switch 310 disposed within the lure body 120. The light switch 310 may comprise a first side having an actuatable switch as shown and a second side having associated switch electronics (not shown).

The light switch 310 may be inserted into the lure body 120 after fabrication thereof, where such fabrication may utilize only one half of the mold. The first side of the light switch 310 may be disposed on the non-planar first side of the lure body 120 and the second side of the light switch 310 may be disposed on the planar second side of the lure body 120. An aperture may be formed within the lure body 120 after fabrication allowing for insertion of the light switch 310 therein. Insertion of the light switch 310 within the lure furnishing provides a user with additional utility of controlling illumination within a given room when choosing to hang the lure furnishing on the wall.

Figure 4:
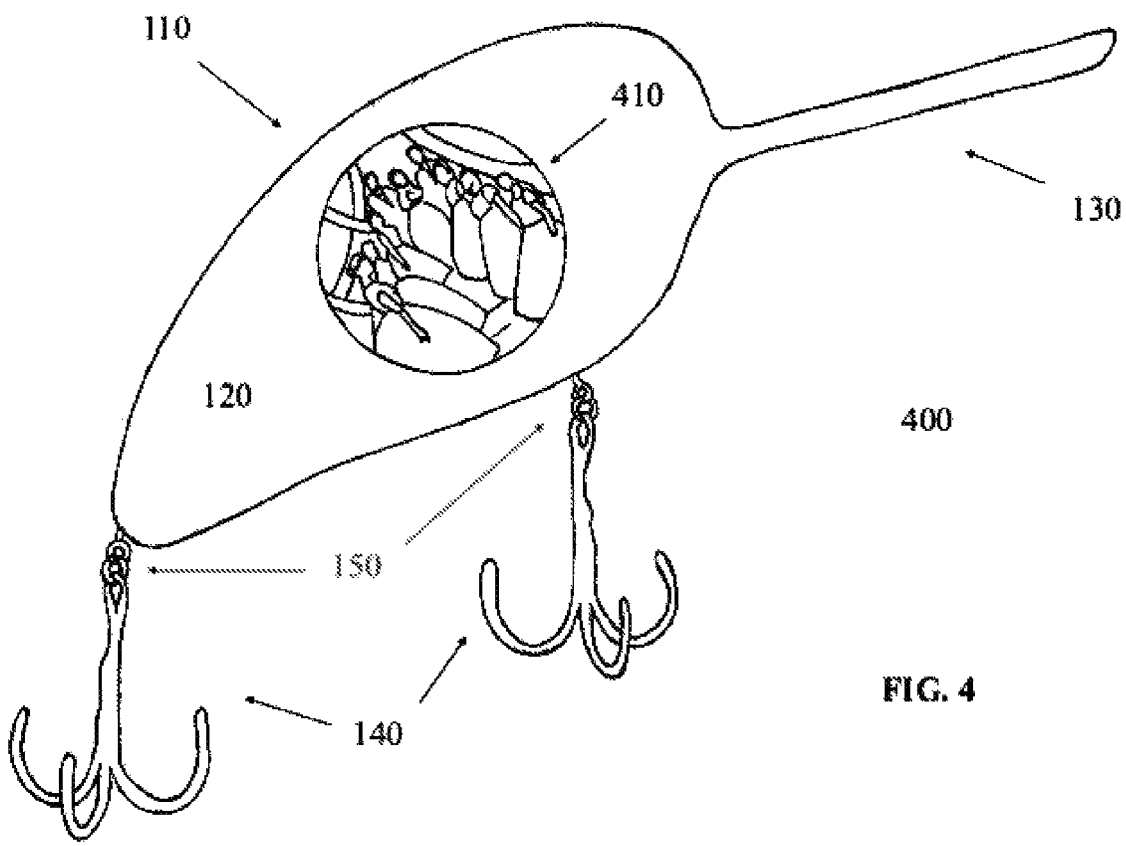
FIG. 4 is a side view of a fishing lure picture frame furnishing in accordance with some embodiments of the present invention.

As shown in FIG. 4, a fishing lure picture frame 400 may comprise the same or similar components described in FIG. 1 with the addition of a picture frame 410 disposed within the lure body 120. The picture frame 410 may comprise a first side having an aperture for display of a picture therein as shown and a second side having associated picture backing materials (not shown).

The picture frame 410 may be inserted into the lure body 120 after fabrication thereof, where such fabrication may utilize only one half of the mold. The first side of the picture frame 410 may be disposed on the non-planar first side of the lure body 120 and the second side of the picture frame 410 may be disposed on the planar second side of the lure body 120. An aperture may be formed within the lure body 120 after fabrication allowing for insertion of the picture frame 410 therein. Insertion of the picture frame 410 within the lure furnishing provides a user with additional utility of displaying photos, such as fishing photos, when choosing to hang the lure furnishing on the wall.

Figure 5:
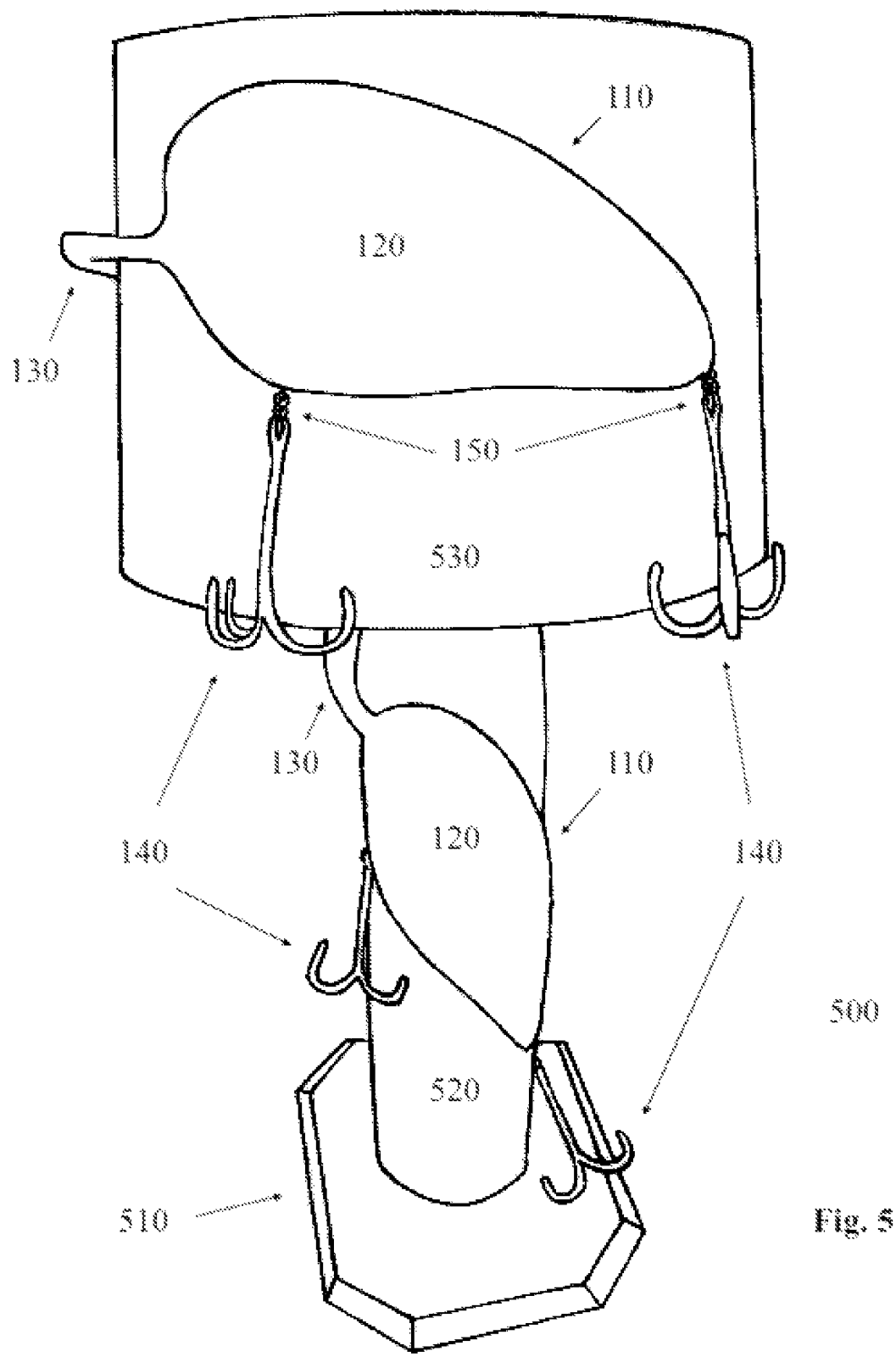
FIG. 5 is a side view of a fishing lure lamp furnishing in accordance with some embodiments of the present invention.

As shown in FIG. 5, a fishing lure lamp furnishing 500 many comprise the same or similar components described in FIG. 1 with the addition of a lamp base 510, a lamp stem 520 and a lampshade 530 all forming a lamp, where one or more fishing lures 110 may be disposed upon such components of the lamp. When disposing the fishing lures 110 upon various portions of the lamp, such as the lamp stem 520 and lampshade 530, the planar second side of the lure body 120 may be disposed adjacent the outer surfaces of the lamp portions, where the planar second side of the lure body is mechanically curved to be non-planar and rest flush against the contouring of such portions of the lamp as shown.

The lure body 120 and elongate member 130 of each lure 110 disposed upon the lamp may be applied to the curved surfaces of the lamp as shown after the lure body 120 and member 130 have been removed from the mold but before it has fully cured, i.e. when the lure body 120 and member 130 are in a flexible semi-solid state, thus allowing the lure body 120 and member 130 to cure into the curved shape of the surface upon which it rests.

As shown in FIG. 6, a method of manufacturing a fishing lure furnishing 600 may comprise at step 610 pouring a liquid lure body material into a first half of a mold and/or a second half of the mold. At step 620, the liquid lure body material hardens after curing and may then have apertures fabricated therein for receiving couplings therein. At step 630, a plurality of hook segments may be bent at each end and may then be coupled together to form one or more hooks for removably attachment to the couplings.

At step 640, the assembled lure may be disposed upon a lamp as described in FIG. 5 or, alternatively, an aperture may be optionally created within the lure body for insertion of an analog clock, light switch or picture frame therein. In the case of the alternative step, the assembled lure is then disposed upon a wall or suspended from a ceiling at step 650.

Those of skill in the art will recognize many modifications may be made to this configuration without departing from the scope, spirit or intent of the claimed subject matter. Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein. Although the present invention has been described in detail, it should be understood that various changes, substitutions and alterations can be made hereto without departing from the spirit and scope of the invention as defined by the appended claims.

The invention claimed is:

1. A fishing lure furnishing, comprising:
a fishing lure body having an elongate member extending therefrom, wherein:
each of the fishing lure body and the elongate member comprise a molded cured fabrication material,
the elongate member is structurally monolithic with the fishing lure body,
the fishing lure body comprises a first side having a non-planar contoured body surface and opposite thereto a second side,
the second side is structurally monolithic with the non-planar contoured body surface and comprises a planar body surface, and
the fishing lure body comprises one or more first apertures disposed at a bottom portion of the fishing lure body; and
one or more sets of hooks removably coupled to the fishing lure body, wherein:
each set of hooks comprises a plurality of hook segments coupled to one another,
each hook segment is coupled at a first end adjacent one or more coupling mechanisms disposed within the one or more apertures and terminates at a second end in a blunted rounded shape, and
the one or more coupling mechanisms detach from the lure body or one or more sets of hooks when a threshold amount of force is applied to the one or more coupling mechanisms.

2. The fishing lure furnishing of claim 1, wherein the plurality of hook segments are coupled to one another via soldering or adhesive bonding.

3. The fishing lure furnishing of claim 1, wherein the hooks may be comprised of aluminum wire or silver solder.

4. The fishing lure furnishing of claim 1, wherein the one or more coupling mechanisms comprise one or more of: threaded screws, looped eyelits, split rings, ring clasps, clips and magnets.

5. The fishing lure furnishing of claim 1, wherein the fishing lure body comprises one or more second apertures disposed at a middle portion of the fishing lure body.

6. The fishing lure furnishing of claim 1, wherein the fishing lure body comprises one or more third apertures disposed at a top portion of the fishing lure body.

7. The fishing lure furnishing of claim 1, wherein the second side having the planar body surface is structured to be disposed flush against a planar surface.

8. The fishing lure furnishing of claim 1, wherein the second side having the planar body surface is mechanically curved in a semi-cured state to be disposed flush against a curved surface.

9. A fishing lure furnishing, comprising:
a fishing lure body having an elongate member extending therefrom, wherein:
each of the fishing lure body and the elongate member comprise a molded cured fabrication material,
the elongate member is structurally monolithic with the fishing lure body,
the fishing lure body comprises opposing first and second sides having symmetric non-planar contoured body surfaces,
the first and second sides are structurally monolithic with one another, and
the fishing lure body comprises one or more first apertures disposed at a bottom portion of the fishing lure body and one or more second apertures disposed at a top portion of the fishing lure body; and
one or more sets of hooks removably coupled to the fishing lure body, wherein:
each set of hooks comprises a plurality of hook segments coupled to one another,
each hook segment is coupled at a first end adjacent one or more coupling mechanisms disposed within the one or more apertures and terminates at a second end in a blunted rounded shape, and the one or more first coupling mechanisms detach from the lure body or one or more sets of hooks when a threshold amount of force is applied to the one or more coupling mechanisms.

10. The fishing lure furnishing of claim 9, wherein the plurality of hook segments are coupled to one another via soldering or adhesive bonding.

11. The fishing lure furnishing of claim 9, wherein the hooks may be comprised of aluminum wire or silver solder.

12. The fishing lure furnishing of claim 9, wherein the one or more coupling mechanisms comprise one or more of: threaded screws, looped eyelits, split rings, ring clasps, clips and magnets.

13. The fishing lure furnishing of claim 9, wherein the fishing lure body comprises one or more third apertures disposed at a middle portion of the fishing lure body.

14. The fishing lure furnishing of claim 9, wherein one or more second coupling mechanisms are disposed in the one or more first apertures disposed at the top portion of the fishing lure body.

15. A fishing lure furnishing, comprising:
a fishing lure body having an elongate member extending therefrom, wherein:
   each of the fishing lure body and the elongate member comprise a molded cured fabrication material,
   the elongate member is structurally monolithic with the fishing lure body,
   the fishing lure body comprises a first side having a non-planar contoured body surface and opposite thereto a second side,
   the second side is structurally monolithic with the non-planar contoured body surface and comprises a planar body surface, and
   the fishing lure body comprises one or more first apertures disposed at a bottom portion of the fishing lure body;
one or more second apertures disposed at a middle portion of the fishing lure body, wherein an analog clock, light switch or picture frame is disposed within the one or more second apertures; and
one or more sets of hooks removably coupled to the fishing lure body, wherein:
   each set of hooks comprises a plurality of hook segments coupled to one another,
   each hook segment is coupled at a first end adjacent one or more coupling mechanisms disposed within the one or more apertures and terminates at a second end in a blunted rounded shape, and
   the one or more coupling mechanisms detach from the lure body or one or more sets of hooks when a threshold amount of force is applied to the one or more coupling mechanisms.

16. The fishing lure furnishing of claim 15, wherein the plurality of hook segments are coupled to one another via soldering or adhesive bonding.

17. The fishing lure furnishing of claim 15, wherein the hooks may be comprised of aluminum wire or silver solder.

18. The fishing lure furnishing of claim 15, wherein the one or more coupling mechanisms comprise one or more of: threaded screws, looped eyelits, split rings, ring clasps, clips and magnets.

19. The fishing lure furnishing of claim 15, wherein the fishing lure body comprises one or more apertures disposed at a top portion of the fishing lure body.

20. The fishing lure furnishing of claim 15, wherein the second side having the planar body surface is structured to be disposed flush against a planar surface.

* * * * *